Sept. 24, 1957     R. R. MOORE     2,807,699
CONVEYOR ASSEMBLY FOR DIELECTRIC HEATER
Filed May 5, 1955     2 Sheets-Sheet 1

Sept. 24, 1957  R. R. MOORE  2,807,699
CONVEYOR ASSEMBLY FOR DIELECTRIC HEATER
Filed May 5, 1955  2 Sheets-Sheet 2

United States Patent Office 2,807,699
Patented Sept. 24, 1957

2,807,699

CONVEYOR ASSEMBLY FOR DIELECTRIC HEATER

Richard R. Moore, Louisville, Ky., assignor to National Cylinder Gas Company, Chicago, Ill., a corporation of Delaware Application May 5, 1955, Serial No. 506,213

21 Claims. (Cl. 219—10.69)

This invention relates to dielectric heating equipment, and more particularly to a conveyor assembly for carrying work into and out of a high-frequency electric field, and has for an object the reduction in heating of a metallic conveyor belt and in sparking between such belt and its metallic supporting structure.

In some dielectric heating systems a conveyor belt is used to carry dielectric work into and out of a high-frequency electric field in order to obtain a continuous processing of work. Some of these systems include a metallic conveyor belt which is supported on metal structure along its flight through the electric field and which may serve, at least in part, as one of the heating electrodes of the system.

Because of the unevenness of the conveyor belts usually employed in present arrangements, and which may be of woven wire construction, as well as other factors, there is encountered considerable undesirable heating of the belt and sparking between the belt and the supporting structure. This frequently results in burning of the belt and the supporting structure as well as material on the belt. Such effect is cumulative. Accordingly, it is an object of the present invention to provide a metallic conveyor belt assembly which will provide adequate mechanical support for a flexible conveyor belt while affording adequate electrical contacting of the belt to reduce localized heating and/or sparking.

Also where such a dielectric heating system is used for the treatment of sand cores and other friable materials having dielectric characteristics, particles of such materials tend to break off and fall through a perforate conveyor belt onto its supporting structure. The presence of such particles greatly reduces the efficiency of electrical contact between the conveyor and the supporting structure with resultant undesirable belt-sparking and high current concentrations in the regions of contact or coextensive regions of the belt and supporting structure. Accordingly, it is another object of the present invention to provide a belt-supporting structure of a form and arrangement such that any materials falling through a perforate conveyor belt will be swept from the regions of contact, thereby greatly improving the electrical connection between the belt and its support. Such structure in one form may be made up of a plurality of conductive conveyor belt-supporting and contacting surfaces arranged in a common plane but in spaced relationship to each other.

More particularly, the supporting structure may be comprised of a plurality of spaced metallic slats extending generally transversely of the direction of travel of the conveyor belt. In a preferred arrangement, the slats are substantially V-shaped and arranged in chevron-like fashion with their vertices directed opposite to the direction of travel of the conveyor belt.

Where the dielectric heating apparatus takes the form of heating electrodes contained within a shielding housing, it is desirable to minimize the high-frequency radiation from the housing. In conveyorized apparatus, the desired end is somewhat complicated by the necessity of having at least two opposite sides of the housing open for passage of the conveyor belt therethrough. Where the conveyor belt is metallic and is inadequately grounded, an undesirable amount of radiation may result due to the conveyor belt having a radio-frequency potential as it passes from the housing. Accordingly, it is another object of this invention to provide, in a shielded dielectric heating applicator, a conveyor assembly which will aid in maintaining at a minimum the amount of high-frequency energy radiated from the applicator.

For other objects and advantages of the present invention, reference may be had to the following detailed description taken in conjunction with the accompanying drawings, in which.

Figure 1:
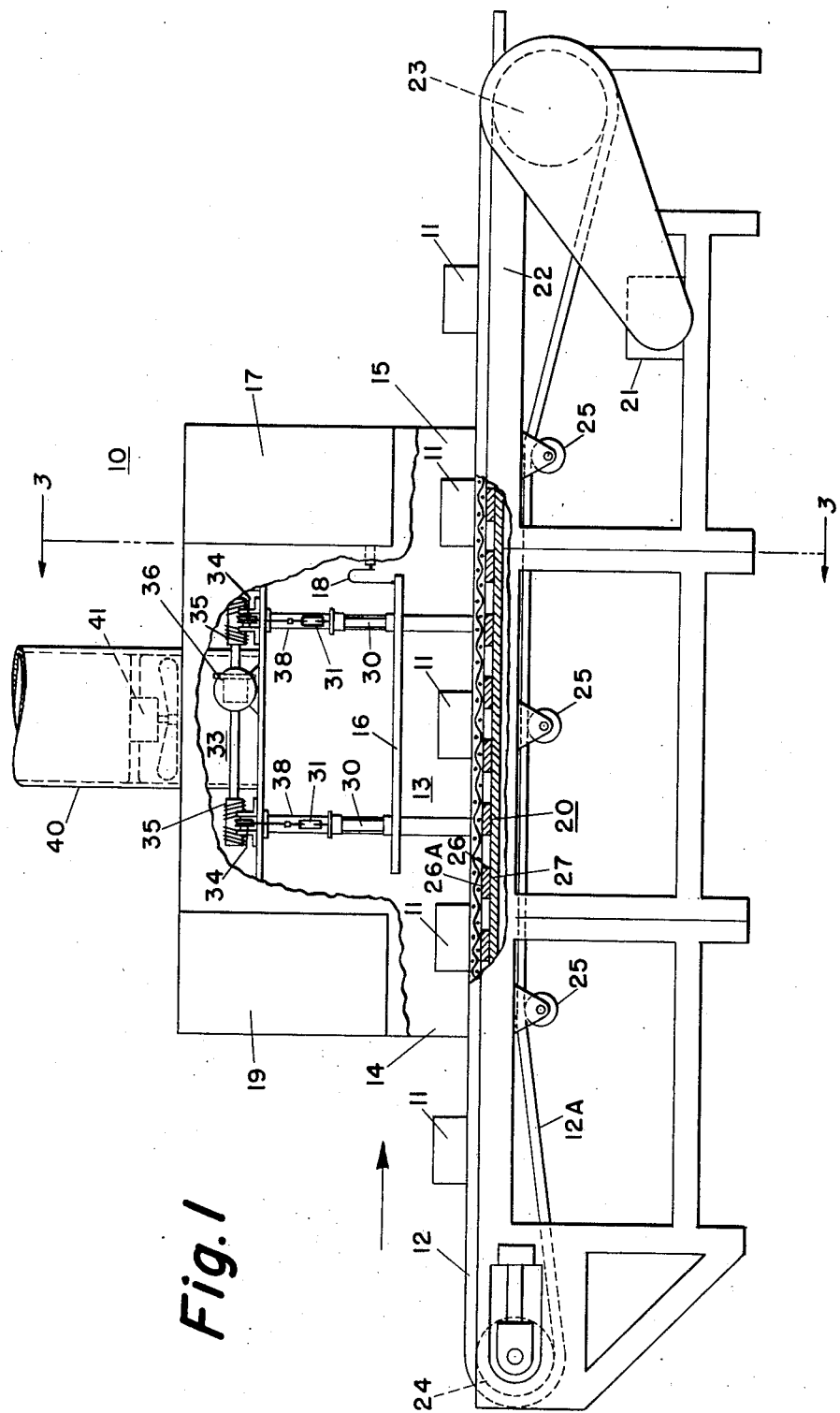
Fig. 1 is a side elevation view of a dielectric heater with portions cut away to illustrate internal construction.

Referring to the drawings, there is illustrated a high-frequency dielectric heating applicator 10 for heating and drying dielectric material 11. The material or work 11 is carried by a metallic conveyor belt 12 into and out of an applicator housing 13 through openings provided by way of an entrance vestibule 14 and exit vestibule 15. Within the housing 13, the work 11 is exposed to a high-frequency electric field produced between an upper electrode structure 16 and a lower electrode which may be comprised in whole by the metallic conveyor belt 12 or in part by conveyor belt 12 and in part by its supporting structure 20. Structure 20 forms a major portion of an electrode when the belt 12 has large apertures. The supporting structure 20 in the illustrated embodiment provides a lower wall for the housing 13, thus preventing the radiation of the electric field through the bottom of the applicator 10.

High-frequency energy is supplied to the electrode structure 16 from a suitable oscillator contained within the cabinet 17 by way of flexible lead 18. The oscillator which may be of any suitable type, for example that illustrated in United States Letters Patent No. 2,666,129, Ellsworth, has its power supply contained in a cabinet 19 mounted over the entrance vestibule 14.

The conveyor belt 12, which is in slidable electrical contact over the supporting structure 20, may be driven by any suitable driving arrangement. For example, an electric motor 21 at one end of table 22 may be provided having a driving shaft mechanically connected to a driven drum 23 for driving the conveyor belt. At the opposite end of table 22 the conveyor belt passes over an idler pulley or drum 24. The lower flight 12A of the conveyor belt 12 is supported for travel beneath a surface of the table 22 by way of a series of idler drums 25.

In the illustrated dielectric heating arrangement, the conveyor belt 12, at least that portion passing through the housing 13, is included electrically in the heating circuit of the applicator. Where in the past a flexible metallic conveyor belt has been supported for travel through an applicator by means of a solid metallic sheet or hearth plate, belt-heating and sparking have occurred due in part to unevenness of the flexible conveyor belt which prevents a uniformly distributed electrical contact between the under side of the conveyor belt and the supporting structure.

In arrangements where the metallic conveyor belt serves as one of the heating electrodes, current passes through contact points between the conveyor belt and its supporting structure to ground. Woven wire conveyor belts are frequently employed and these generally are of such construction that the individual links may be of unequal thickness due to several causes, including manufacturing tolerances. With such belts, all the individual links do not have uniform electrically conductive engagement with the metallic supporting structure. Therefore, the effective electrical current carrying contact area between the conveyor belt and its supporting structure is reduced to a small percentage of the apparent contact area. For example, where in a given area 100 electrical contact points are potentially available, only 10 effective contact points actually may be established between the conveyor belt and its supporting structure. Because current can flow from one link to another of the woven wire belt, current concentrations occur at the reduced number of points of electrical contact with the supporting structure, resulting in overheating of the belt and even in the melting of holes in the belt structure. The overall heating of the belt may be so extensive as to burn the material carried by the belt.

Where the conveyor belt is both flexible and perforated and carries friable dielectric material, such as sand cores, into and out of the high-frequency electric field, particles of the material fall through the conveyor belt and onto the supporting structure. If the supporting structure is flat and unbroken, the accumulation of such particles on the supporting structure further reduces the area and efficiency of the electrical contact between the conveyor belt and the supporting structure, thus giving rise to further heating of the belt and to sparking or the creation of arcs between the under side of the conveyor belt and the supporting structure.

More particularly, as the sand or friable material accumulates beneath the conveyor belt, which it is recalled has an uneven bottom surface, it inescapably permits the sand to move between its bottom surface and the flat unbroken supporting surface. This action is cumulative and eventually the belt may be almost entirely supported on a layer of sand or other friable material. The sand itself is an insulator and thus the R.-F. potential of the conveyor not only rises to relatively high values but undesirable arcing and burning and heating of the conveyor belt occur throughout a multiplicity of points between it and the flat and unbroken supporting structure.

In accordance with the present invention, the sparking and heating are substantially entirely eliminated and the R.-F. potential of the conveyor belt is greatly reduced. These results are accomplished in accordance with a number of features of the present invention. First, there is provided a greatly increased pressure per unit area of contact between the conveyor and the supporting structure. This is accomplished by subdividing the supporting structure into a plurality of spaced supporting areas. Their total area is materially less than that of the conveyor belt. Thus, for a given weight of the movable conveyor structure, the pressure per unit area on the supporting structure is greatly increased over what it would be on a flat and unbroken structure coextensive with the area of the conveyor belt. By increasing the pressure at each area of contact the lowermost points of the conveyor belt are pressed with high force per unit area downwardly and thus displace any sand or friable material in the path thereof and additionally are pressed into good electrical engagement with the spaced supporting surfaces, thus providing a continuation of the electrical circuit with low resistance and impedance.

By providing spaced supporting surfaces with channels or recesses therebetween, there are provided a plurality of pockets into which the sand or friable material may be swept by the lower surface of the conveyor belt, thus maintaining on the supporting surfaces a minimum of the undesired insulating material which contributes to the undesirable operating conditions.

While it might first appear that more belt links or contacting points of the conveyor will engage a flat unbroken supporting structure, it has been found that with a discontinuous or spaced supporting structure the total resistance or impedance is less and that actually there are more points of effective electrical contact where the total area of the discontinuous supporting structure is only 20% to 35% of the area of the conveyor belt. This result appears to be due to the fact that the increased pressure per unit area prevents the particles of material from lifting a multiplicity of the points of contact of the conveyor belt from the discontinuous surface and by reason of the further fact that there remains on the discontinuous surfaces less sand per unit area than that which rapidly accumulates on a continuous surface. Thus, the end result appears to be a greater number of current-carrying contacting points between the conveyor belt and the discontinuous structure with resultant less current density per contact and accordingly, less heating and substantial eliminating of sparking.

In one form of the present invention, the supporting structure 20 is comprised of a plurality of spaced contacting surfaces 26A here shown provided by a plurality of slats 26 disposed along the path of travel of the conveyor belt and each of which slats extends laterally or transversely across said path.

Each of the metallic slats 26 is comprised of a suitable conductive material, such as aluminum, and may be supported by a solid metallic hearth plate 27 electrically connected to wall structure 13A of the housing 13. The individual slats 26 may be secured to the hearth plate in any well-known manner, such as by way of bolts or by way of welding, to form a unitary structure.

The structure comprising the slats 26 may be otherwise fabricated from a single punched-out sheet or several sheets, and the belt-contacting surfaces 26A alternatively may be provided by corrugated sheeting, particularly where non-friable materials are to be carried by the conveyor belt. In still other arrangements and within the scope of the present invention, the supporting slats 26 may be spaced above the solid hearth plate 27.

Figure 2:
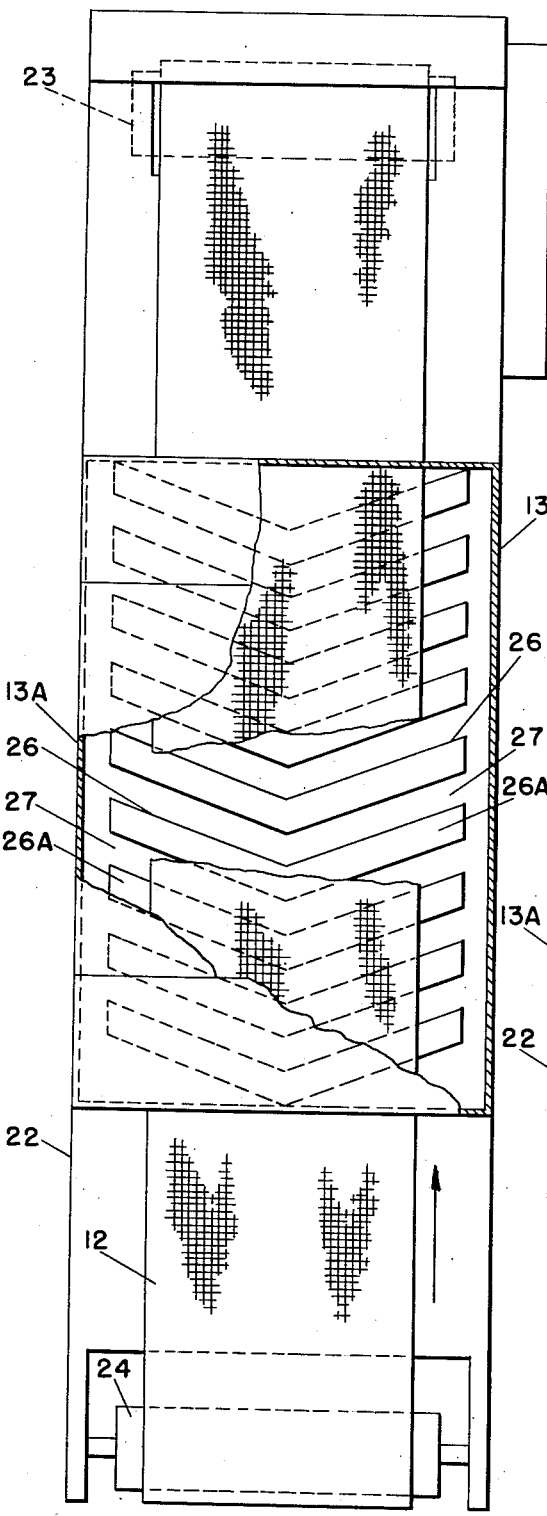
Fig. 2 is a top plan view of Fig. 1, with portions cut away, illustrating a preferred embodiment of the present invention.

Each of the slats 26, in the preferred embodiment, is substantially V-shaped as appearing in plan view (Fig. 2) and the slats are arranged in chevron-like fashion nesting substantially one within the other along the path of movement of the conveyor belt for improved support of the belt. Straight slats may be used and have produced adequate reduction in belt-sparking and heating. The straight slats of aluminum approximately 4⅛ inches wide and ¼ inch thick were spaced along the under side of the conveyor on 12¼ inch centers. Where straight slats 26 extend across the conveyor, they may be disposed at an acute angle with respect to the direction of conveyor travel.

The spacing between the belt-contacting surfaces 26A may be varied within a range determined in part by the area of the contacting surfaces. One criterion is the maintenance of the belt as a substantially planar surface, that is, avoidance of belt sagging. Another is the provision of adequate electrical contacting area to provide a reasonably low current density through the contacting portions of the conveyor belt. The total surface area of the contacting surfaces 26A disposed under the conveyor belt 12 should be preferably 20% to 35% of the area of the corresponding surface of the conveyor belt. Of course, this range of percentage will be materially changed with change of such conditions as the width of the individual contacting surfaces 26A and the amount of load to be imposed on the conveyor belt. A suitable ratio of contacting area width; i. e., width of slats or surfaces, to the distance between the adjacent contacting area or surfaces; i. e., distance between slats or surfaces, is approximately 3:8.

Further in connection with the spacing of the belt-supporting surfaces, it is to be observed that the increase in the pressure per unit area thereof is effective in its own right to decrease the electrical resistance and impedance between the conveyor and the supporting surfaces considered from the electrical standpoint.

As already mentioned, the spaced contacting surfaces 26A of the slats 26 also prevent the accumulation of dielectric material which may fall from the work 11 through perforations of the conveyor belt, illustrated as being of the woven wire type. Any material that does pass through the conveyor belt 12 will be swept into the spaces between the slats 26. In the preferred arrangement, the slats 26 have their vertices arranged in direction opposite to the dirction of travel of the conveyor belt, which direction is illustrated by the arrow. Accordingly, any material tending to pass through the conveyor belt is directed toward the opposite ends of the slats 26 by the sweeping action of the conveyor belt. On occasion it may be necessary to remove the particles of material gathered in the spaces between the slats 26. In such event, the particles are readily removed by employing an air hose to blow the particles from the spaces. Of course, other cleaning devices can be used, such for example, as vacuum cleaners.

As thus far described, the improved conveyor belt-supporting arrangement increases the unit pressure of the conveyor belt 12 on the supporting structure 20 as compard with other arrangements employing solely a solid hearth plate. The increased pressure is due to the reduction in the surface area of the structure employed to support the belt and results in adding more links of a woven wire conveyor belt in effective electrical contact with the conductive surfaces 26A, since the increased pressure tends to cause them to move over and in electrical contact with the spaced supporting structures. Because of the greater number of conveyor belt links in electrical contact with the surfaces 26A, the current density through the individual contacting links is decreased, resulting in a lower overall conveyor belt temperature. The decrease of current density is effected despite a decrease in the overall supporting area presented to the conveyor belt by the structure 20. This is due to the fact that although the overall number of conveyor belt contact links available for contact with the surfaces 26A is effectively reduced by reduction in supporting surface area, the percentage of the links in actual electrical contact is greatly increased so that there is effectively a greater number of links in contact with the supporting surfaces. In addition, as the particles begin to accumulate and fill portions of the spaces between the slats 26, the sweeping action of the conveyor belt in conjunction with the shape of the slats will move the particles toward the opposite edges of the hearth plate 27.

Improved operation may be obtained by having the spaced slats positioned only in the housing 13. The remainder of the supporting structure may be solid sheets or plates. However, the best results are obtained when the spaced slats are extended through the applicator including the entrance and exit vestibules, 14 and 15.

The provision of the spaces between the discontinuous supporting surfaces 26A also provides for a lower average belt temperature. This result is achieved by reason of the discontinuous connection of any given portion of the conveyor belt with the supporting surface. Thus as the conveyor traverses the heating zone below the heating electrode 16 the electrical contacts between the conveyor and the supporting structure are in succession completed for short intervals of time and are interrupted for short intervals of time. Each time the circuit connection is interrupted the current-carrying surface of the conveyor is then air-cooled as it passes over the space between the supporting surfaces. The cooling is both by radiation and normal convection cooling. The later may be augmented if desired by air-circulating means functioning through the spaces between the supporting surfaces.

The operation of dielectric heaters is subject to government regulation as to the permissible intensity of high-frequency energy radiated from the equipment. Hence, it is desirable to make the housing of the dielectric heating applicator a substantially complete enclosure. In carrying out this feature, the illustrated applicator 10 is provided with the entrance and exit vestibules 14 and 15. However, this arrangement alone has not always proved adequate when the metallic conveyor belt has not been properly grounded. Unless the conveyor belt is adequately grounded, it will carry an R.-F. potential, originally required, for example, in the electric field of the applicator, through the vestibules 14, 15 and beyond.

By employing my improved supporting structure, a substantially improved grounding of the conveyor is effected so that the R.-F. potential on the conveyor as it enters and leaves the applicator, is practically insignificant. For example, measurements have been taken of the radiation from the exit vestibule of a dielectric heating applicator embodying the present invention and at a point spaced 15 inches from the exit vestibule. The probing instrument gave an indication of 90 units. Translating the intensity of that radiation into what it would be at a mile from the apparatus—the conventional distance in checking on radiation from high-frequency heating apparatus—the intensity or level is so insignificant as to be neglected. It is doubtful whether it could even be detected.

The conveyor arrangement above described is suitable for use with any type of dielectric heater for the continuous production of treated dielectric work. Such applicators would include resonant applicators including those of the reentrant cavity or resonator type described in U. S. patent to Warren, No. 2,783,344 dated February 26, 1957.

In the illustrated applicator 10, the heating electrode 16 may be raised and lowered relative to the upper surface of the conveyor 12 to accommodate work of varying height or to vary the intensity of the field between the electrode and the conveyor belt or electrode 12. For this purpose, the electrode 16 is supported by way of spaced insulating rods 30. The rods 30 are in turn connected by way of turnbuckles 31 and cables 32 to a raising and lowering mechanism 33 including pulleys 34, cable drums 35 and an electric motor 36 which is mechanically connected to the cable drums 35 by means of a pulley and belt arrangement 37.

Figure 3:
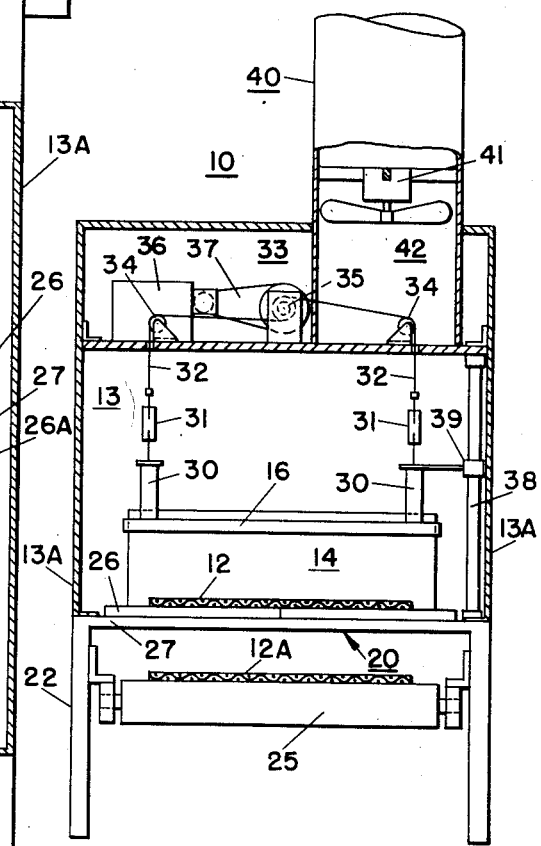
Fig. 3 is a cross-sectional view taken along the line substantially corresponding to line 3—3 of Fig. 1.

The raising and lowering of the heating electrode 16 is guided by vertically disposed spaced metallic rods 38, Fig. 3, on which are slidably mounted sleeves 39 in turn rigidly connected to the insulating rods 30 adjacent the guide rods 38.

During the course of heating the dielectric work, moisture in the form of steam is given off in large quantities. In order to remove the steam from the housing 13, there may be provided a blower arrangement 40, including a fan 41 within a duct 42 (Fig. 3) extending into the housing 13. The blower arrangement 40 may draw air through the housing 13 by way of the entrance and exit vestibules 14, 15 or blow air into the housing and through the perforate conveyor belt 12 and into the spaces between slats 26 in removal of the steam.

The passage of air through the conveyor belt and between the spaced slats 26 aids in maintaining a low average conveyor belt temperature. The cooling of the conveyor belt will take place during that time when portions of the belt are disposed over the spaces between the slats 26.

It shall be understood that the invention is not limited to the specific arrangement shown and that changes and modifications may be made within the scope of the appended claims.

What is claimed is:

1. High-frequency heating apparatus comprising means for producing between a pair of spaced electrodes a high-frequency electric field, a load-carrying flexible metallic conveyor belt forming one of said electrodes, metallic supporting structure for said belt comprising a plurality of electrically conductive supporting elements extending across the path of said belt, spaced one from the other along said path, and stationary relative to said path of said belt, said belt and the load carried thereby being supported on said spaced elements, means for driving said conveyor belt relative to said stationary elements, the underside of said belt riding on said elements to complete from changing areas of said belt to said elements a plurality of circuit connections, said other heating electrode extending above and along said conveyor belt, and a source of high-frequency energy connected to said electrodes, the connection of said source to said conveyor belt being characterized by said plurality of electrical connections from said elements to said changing areas of said metallic belt.

2. A dielectric heating applicator comprising a housing, a pair of heating electrodes whose electric field is contained within said housing, one of said electrodes being provided at least in part by a flexible metallic conveyor belt structure extending through said housing for carrying work into and out of the electric field, means for supporting said conveyor belt structure comprising a plurality of spaced stationary metal slats disposed along the path of travel of said conveyor and mechanically and electrically engaging portions of the underside of said conveyor belt structure spaced one from the other along said path, and means including said slats for completing a plurality of circuit connections to said metallic conveyor belt.

3. A conveyor belt supporting assembly for a dielectric heating applicator of the type in which an electrically conductive conveyor belt serves as one of the heating electrodes, said assembly comprising a plurality of spaced conductive surfaces disposed along the path of travel of the conveyor belt and at least in the area where the dielectric work is being heated for electrically contacting the portions of the under surface of the belt spaced one from the other along said path and for supporting the conveyor belt during its travel through the applicator, and means including said surfaces for completing a plurality of circuit connections to said belt.

4. A dielectric heating applicator including a flexible metallic conveyor belt, structure for supporting said conveyor belt for travel through the applicator, a heating electrode disposed above said belt for heating dielectric material in the space between it and said belt, said supporting structure comprised of a plurality of conductive elements disposed in spaced relation along the path of travel of said conveyor belt and on which elements said belt rides, each of said elements being at an angle to the path of travel of said conveyor belt, and means including said elements for completing a plurality of circuit connections to said belt.

5. The dielectric heating applicator of claim 4 in which said flexible conveyor belt is perforated, and in which the spacing between said elements provides zones at least within the area defined by said electrodes into which particles of material dropped from work carried by said conveyor belt may pass in avoidance of accumulation of matter tending to reduce electrical contact between the supporting structure and said conveyor belt.

6. The applicator of claim 4 in which said elements are substantially V-shaped and arranged in chevron fashion.

7. The applicator of claim 6 in which the vertices of said elements are directed opposite to the direction of movement of said conveyor belt.

8. The applicator of claim 4 in which said elements are supported upon and electrically connected to a stationary metallic hearth plate of area at least coextensive with that of said heating electrode.

9. The applicator of claim 5 in which said elements are supported upon and in fixed relation to a solid metallic hearth plate.

10. The applicator of claim 6 in which said elements are supported upon and are electrically connected to a solid metallic hearth plate.

11. A dielectric heating applicator comprising a housing having conductive wall structure, heating electrodes whose electric field is contained within said housing, said housing having oppositely disposed entrance and exit openings, one of said heating electrodes being a flexible metallic conveyor belt extending through said housing by way of the openings for carrying dielectric work into and out of said electric field, and means for supporting said conveyor belt in its travel through said housing comprising a plurality of spaced grounded metallic slats disposed at least within the area of said electric field and in contact with the underside of said conveyor belt, the spacing of said slats providing a multiplicity of circuit connections to said belt and decreased resistance to ground of said connections to said conveyor belt to reduce the high-frequency potential on said conveyor belt thereby to minimize the radiation of high-frequency energy from the openings of said housing.

12. A conveyor belt assembly for a dielectric heating applicator of the type in which the conveyor belt serves at least in part as one of the heating electrodes, said assembly comprising a woven wire conveyor belt, and means for supporting said conveyor belt and for providing electrical circuit connections from said conveyor belt to an electrical ground, said supporting means extending along the path of travel of said belt at least in the area where dielectric work is being heated, said supporting means being subdivided lengthwise of said belt, the subdivisions thereof being spaced one from the other with a width at least equal to the width of said belt and having a total belt-containing area substantially less than the area of said belt which extends over said supporting means.

13. A dielectric heating applicator comprising a housing having conductive wall structure, heating electrodes whose electric field is contained within said housing, one of said heating electrodes being a flexible metallic perforate conveyor belt extending through said housing for carrying dielectric work into and out of said electric field, means for supporting said conveyor belt in its travel through said housing having a plurality of spaced raised surfaces at least within the area of said electric field and said conveyor belt being slidably supported on said raised surfaces and in electrical contact therewith, means including said surfaces for completing a plurality of circuit connections to said belt, and ventilating means for creating a passage of air through the spaces between said slats and through said belt in reduction of the temperature of said belt.

14. A conveyor belt supporting assembly for a dielectric heating applicator of the type in which a flexible metallic conveyor belt is employed to carry work into and out of the applicator, said supporting assembly comprising a plurality of electrically conductive elements having belt-supporting surfaces disposed in spaced relationship along the path of travel of the belt, the surfaces of said elements extending above the rest of said assembly for mechanically engaging in supporting fashion and electrically contacting the conveyor belt at a plurality of areas spaced one from the other, and means including said surfaces for completing a plurality of circuit connections to said belt.

15. A conveyor belt supporting assembly as in claim 14 in which said elements are spaced slats each arranged substantially transverse to the direction of travel of the conveyor belt.

16. A conveyor belt supporting assembly as in claim 14 in which said elements are V-shaped slats and have their vertices in alignment with respect to the path of travel of said conveyor.

17. A conveyor belt supporting assembly as in claim 15 in which said slats are supported upon a solid metallic plate extending at least coextensively with the area bounded by said slats.

18. In a dielectric heating apparatus having a pair of heating electrodes between which there is established an electric field for heating work disposed therebetween, the combination of a flexible metallic conveyor of the open-mesh type forming at least a part of one of said electrodes and extending in spaced relation with the other of said electrodes for carrying work into and out of the space between them, supporting structure for said conveyor, means for minimizing sparking and heating of said conveyor by increasing the contact pressures between said conveyor and said supporting structure, comprising a plurality of spaced stationary metal slats disposed along the path of travel of said conveyor electrically in contact with the underside of said conveyor and providing mechanical support thereof in zones of restricted area, and means including said slats for completing a plurality of circuit connections to said metallic conveyor.

19. The combination set forth in claim 18 in which said spaced slats are of substantial thickness to provide a plurality of channels into which material dropping through said conveyor is deposited and is thereby kept from finding its way between the upper surface of said metal slats and said conveyor.

20. The combination set forth in claim 19 in which said channels extend across and are open from one side to the other of said conveyor for cleaning thereof.

21. The method of reducing the average operating temperature of a conveyor movable through a high-frequency heating zone which comprises continuously making and breaking in the heating zone electrical circuits extending through contact points of the conveyor, after the breaking of the circuit for each of said contact points moving the contact points through an unobstructed zone for air-cooling thereof, and continuously sweeping foreign particles which fall in regions where the heating circuits are made into said zones of air-cooling.

References Cited in the file of this patent

UNITED STATES PATENTS

| | | |
|---|---|---|
| 2,491,687 | Nutt | Dec. 20, 1949 |
| 2,530,680 | Burkholder | Nov. 21, 1950 |
| 2,640,141 | Vore et al. | May 26, 1953 |
| 2,674,050 | Pound | Apr. 6, 1954 |